(12) United States Patent
Partee et al.

(10) Patent No.: US 8,804,262 B1
(45) Date of Patent: Aug. 12, 2014

(54) COMPENSATION FOR WRITER CROSSTALK IN A MULTI-CHANNEL TAPE RECORDING HEAD

(71) Applicant: Oracle International Corporation, Redwood City, CA (US)

(72) Inventors: Charles Partee, Lyons, CO (US); Kevin McKinstry, Westminster, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/924,962

(22) Filed: Jun. 24, 2013

(51) Int. Cl.
*G11B 5/09* (2006.01)

(52) U.S. Cl.
USPC ......... 360/46; 360/55; 360/77.12; 360/78.02; 360/90

(58) Field of Classification Search
None
See application file for complete search history.

(56) References Cited

U.S. PATENT DOCUMENTS

| 7,157,871 | B2 * | 1/2007 | Azuma | 318/258 |
| 7,986,485 | B2 | 7/2011 | McKinstry et al. | |
| 2002/0006004 | A1 * | 1/2002 | Miyamura | 360/53 |
| 2013/0321949 | A1 * | 12/2013 | Cherubini et al. | 360/77.13 |

OTHER PUBLICATIONS

Biskeborn et al., "Crosstalk Between Write Transducers", IEEE Transactions on Magnetics, vol. 44, No. 11, Nov. 2008, pp. 3625-3628.

* cited by examiner

*Primary Examiner* — Muhammad N Edun
(74) *Attorney, Agent, or Firm* — Brooks Kushman P.C.

(57) ABSTRACT

In at least one embodiment, a data storage system is provided. The system includes a controller that is configured to determine a direction of current flow to a first write element to write first data on a magnetic tape and to determine a direction of current flow to each of a plurality of neighboring write elements to write corresponding data on the magnetic tape. The controller is further configured to compare the direction of current flow to the first write element to the direction of current flow to the plurality of neighboring write elements. The controller is further configured to control the first write element to write the first data in response to comparing the direction of current flow to the first write element to the direction of current flow to each of the neighboring write elements.

20 Claims, 3 Drawing Sheets

COMPENSATION FOR WRITER CROSSTALK IN A MULTI-CHANNEL TAPE RECORDING HEAD

TECHNICAL FIELD

Various aspects as disclosed herein generally relate to data storage systems as used in connection with magnetic tape.

BACKGROUND

As data tracks on magnetic tape become narrower, the challenge to properly track head location relative to such tape increases significantly. One factor of interest relates to tape dimensional stability. One effective method to mitigate tape dimensional stability is to space channels (or data tracks) on the recording head closer together. However, as write elements are positioned closer to one another, such elements can electromagnetically interfere with one another during a write operation. One write element that receives electronic instructions to write a particular data pattern on a track may experience an electromagnetic interference (EMI) condition (or "cross-talk") from neighboring write elements thereby changing (generally degrading) the data pattern. Such cross-talk may limit the proximity that the write elements are positioned with respect to one another.

Cross-talk may be quantified in one way by (i) obtaining a measurement of a Viterbi Quality Metric (VQM) when all of the write elements are writing the same data pattern on the tape (ii) obtaining another measurement of the VQM when all of the write elements are writing different data patterns, and (iii) comparing both VQM measurements (i.e., VQM measurement when writing the same data pattern and VQM measurement when writing different data patterns) to one another. The VQM measurement typically ranges from 0 to 1 where higher values are generally indicative of better channel quality.

In one example, VQM measurements were obtained on a driver with a 42.6μ channel pitch with data patterns that either suppress cross-talk (e.g., all channels having similar data patterns being written thereon), or encourages cross-talk (e.g., all channels having different data patterns being written thereto). The resulting VQM was observed to drop by about 0.1 for the data patterns that encourage cross-talk. Also, it is known that cross-talk generated during a write operation may cause a significant transition shift for writers on a small channel pitch as disclosed in "Crosstalk Between Write Transducers," R. G. Biskeborn, P. Herget and P. O. Jubert, IEEE Trans Mag 44, No. 11, November 2008, p. 3625.

Tape dimensional stability generally corresponds to the notion of retaining a precise track to channel spacing such that an empty space is not left on the track or that data is not written on a corresponding track that was previously written to. While a small channel pitch may mitigate the effects of tape dimensional stability, the cross-talk generated at this channel pitch may be large.

With cross-talk, a magnetic field from a write element may be modeled as a dipole where the magnetic field drops by $1/d^3$, where d is the distance from the write element. Generally, if various write elements are far enough apart from one another, then the magnetic field drop (e.g., $1/d^3$) is substantial and the ensuing cross-talk between a plurality of write elements is small. However, if the write elements are positioned closer to one another, the cross-talk between such write elements increases. If the write elements are spaced twice as close together, one would expect to see eight times as much cross talk. In view of the foregoing, it is desirable to cancel cross-talk generated by write elements during a write operation.

SUMMARY

In at least one embodiment, a data storage system is provided. The system includes a controller that is configured to determine a direction of current flow to a first write element to write first data on a magnetic tape and to determine a direction of current flow to each of a plurality of neighboring write elements to write corresponding data on the magnetic tape. The controller is further configured to compare the direction of current flow to the first write element to the direction of current flow to the plurality of neighboring write elements. The controller is further configured to control the first write element to write the first data in response to comparing the direction of current flow to the first write element to the direction of current flow to each of the neighboring write elements.

BRIEF DESCRIPTION OF THE DRAWINGS

Various embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
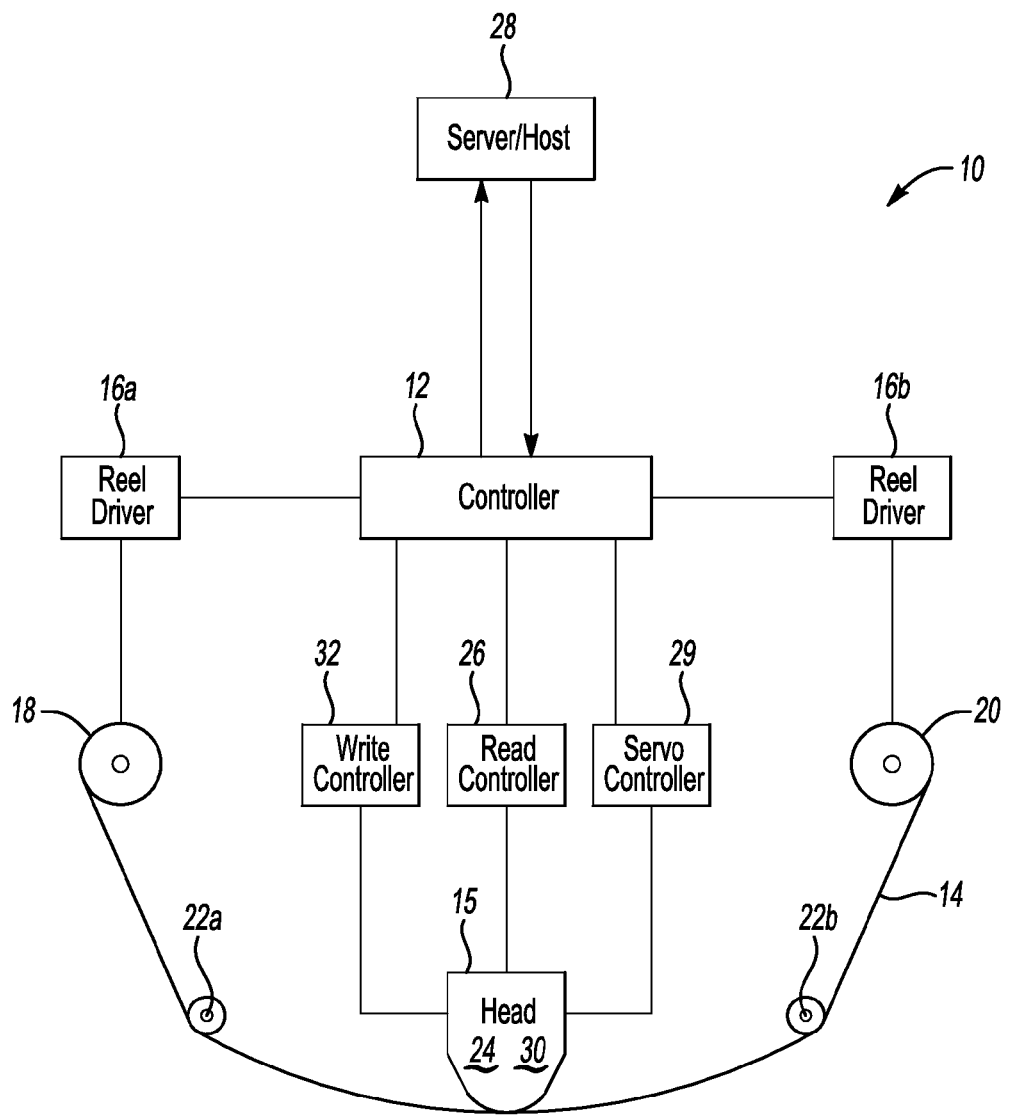
FIG. 1 depicts a data storage system in accordance to one embodiment.

As required, detailed embodiments of the present disclosure are disclosed herein; however, it is to be understood that the disclosed embodiments are merely exemplary of an implementation that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM) ("the memory"), or other suitable variants thereof) and software which co-act with one another to perform operation(s) disclosed herein. In addition, it is recognized that any one or more of the electrical devices as disclosed herein is capable of executing instructions stored on the memory device for compensating for cross-talk that may be generated during a write operation. Further, it is recognized that a computer-program product may be provided in view of the disclosure herein that is embodied in a non-transitory computer readable medium that is programmed to compensate for cross-talk generated during a write operation.

In general, as data tracks on magnetic tape become narrower, it may be necessary to package write elements closer together to write on such narrower tracks. While packaging write elements closer together may enable the write elements to write on the narrower tracks, the close proximity of the neighboring write elements generate interference which changes the moment in time a particular writer element that is positioned proximate to the neighboring write elements writes data to the track.

The disclosure as set forth herein provides, among other things, a system and a method for compensating for writer cross-talk in connection with writing data on a magnetic tape. A controller or other suitable variant generally controls various write elements to write data on corresponding tracks (or channels) of the magnetic tape. Since the data to be written channels are known in advance of the data being written to the tape from the write elements by the controller, the controller may be configured to predict the manner in which the EMI (or cross-talk) is generated by various neighboring write elements in reference to a particular write element during the write operation and to modify the timing in which the particular write element writes data to the tape to minimize the cross-talk generated by neighboring write elements. These features and others will be described in more detail below.

FIG. 1 depicts a data storage system 10 in accordance to one embodiment. The system 10 includes a controller 12 for use in writing and reading data to and from a magnetic tape 14 (or media). A magnetic head 15 (or read/write head) is electrically coupled to the controller 12 for reading and writing data to and from the tape 14. The controller 12 is operably coupled to a plurality of reel drivers 16a-16b ("16"). The controller 12 electronically provides information to the plurality of reel drivers 16 for controlling speed and tension of the tape 14. For example, the reel driver 16a controls a source reel 18 to control the speed of travel of the tape 14 to the read/write head 15. The reel driver 16b controls a take up reel 20 to control the speed of travel of the tape 14 away from the read/write head 15. The take up reel 20 spools the tape 14 after the tape 14 has traveled past the read/write head 15.

A first roller 22a interfaces with the source reel 18 for enabling the tape 14 to travel to the read/write head 15. A second roller 22b interfaces with the first roller 22a and the take up reel 20 for enabling the tape 14 to travel away from the read/write head 15. In general, the tape 14 is conveyed longitudinally across the read/write head 15 from the source reel 18 to the take up reel 20.

The read/write head 15 generally comprises a plurality of electromechanical devices for writing and reading data to and from the tape 14. In one example, the read/write head 15 comprises a plurality of read elements 24 for reading data from a corresponding track (or channel) (not shown) from the tape 14. A read controller 26 is operably coupled to the controller 12 for converting read information indicative of data as read from the tape 14. For example, the read controller 26 includes, but not limited to, an analog to digital converter (ADC) for converting analog data from the tape 14 into digital data. A server 28 is operably coupled to the controller 12 for receiving and sending the digital data. The digital data stored on the tape 14 can be sent to the server 28 for later retrieval by a user.

In one example, the server 28 may be remote from the controller 12 and wirelessly receive such digital data from the controller 12. In another example, the server 28 may be hardwired coupled to the controller 12 and be positioned proximate to the controller 12 for receiving the digital data from the tape 14 through such a connection. The placement of the server 28 within the system 10 may vary based on the desired criteria of a particular implementation. A servo controller 29 is operably coupled to the controller 12 and to the read/write head 15. The servo controller 29 provides information indicative of a location (or position) of the read/write head 15 over the tape 14 to the controller 12.

The read/write head 15 comprises a plurality of write elements 30 with each write element 30 being configured to write data on a corresponding track (or channel) (not shown) of the tape 14. A write controller 32 is operably coupled to the controller 12 for converting write information indicative of the data to be written to the tape 14. For example, the write controller 32 includes a digital-to-analog converter (DAC) for converting the digital data indicative of the data that is to be written on the tape 14 into analog data for storage on the corresponding track of the tape 14. It is recognized that the desired digital data to be written on the tape 14 may be provided from the controller 12 and/or the server 28.

Each write element 30 is generally positioned in close proximity to one another on the read/write head 15. This condition mitigates tape dimensional stability. However, positioning each write element 30 in close proximity with one another increases the risk of one write element 30 being exposed to electromagnetic interference (or cross-talk) from neighboring write elements 30 during a write operation. Such cross-talk degrades the quality of written information on the tape 14 and limits the allowable packaging of neighboring write elements 30 on the read/write head 15.

To account for the cross-talk, the controller 12 is configured to modify the time (via write pre-compensation values) in which a particular write element 30 writes data to a corresponding channel on the tape 14. For example, the controller 12 may delay the time in which a particular write element 30 writes data to the tape 14. In another example, the controller 12 may advance, in time, the manner in which a particular write element 30 writes data to the tape 14. Since the controller 12 has knowledge of the information that is to be written on a corresponding track of the tape 14 before the write operation is actually performed, the controller 12 may assess the manner in which data is to be written by one or more neighboring write elements 30 before the actual write operation and adjust the time in which the particular write element 30 that is positioned proximate to the neighboring write elements 30 writes the data to the tape 14 so as to avoid cross-talk from the neighboring write elements 30. This aspect and others will be discussed in more detail below.

Figure 2:
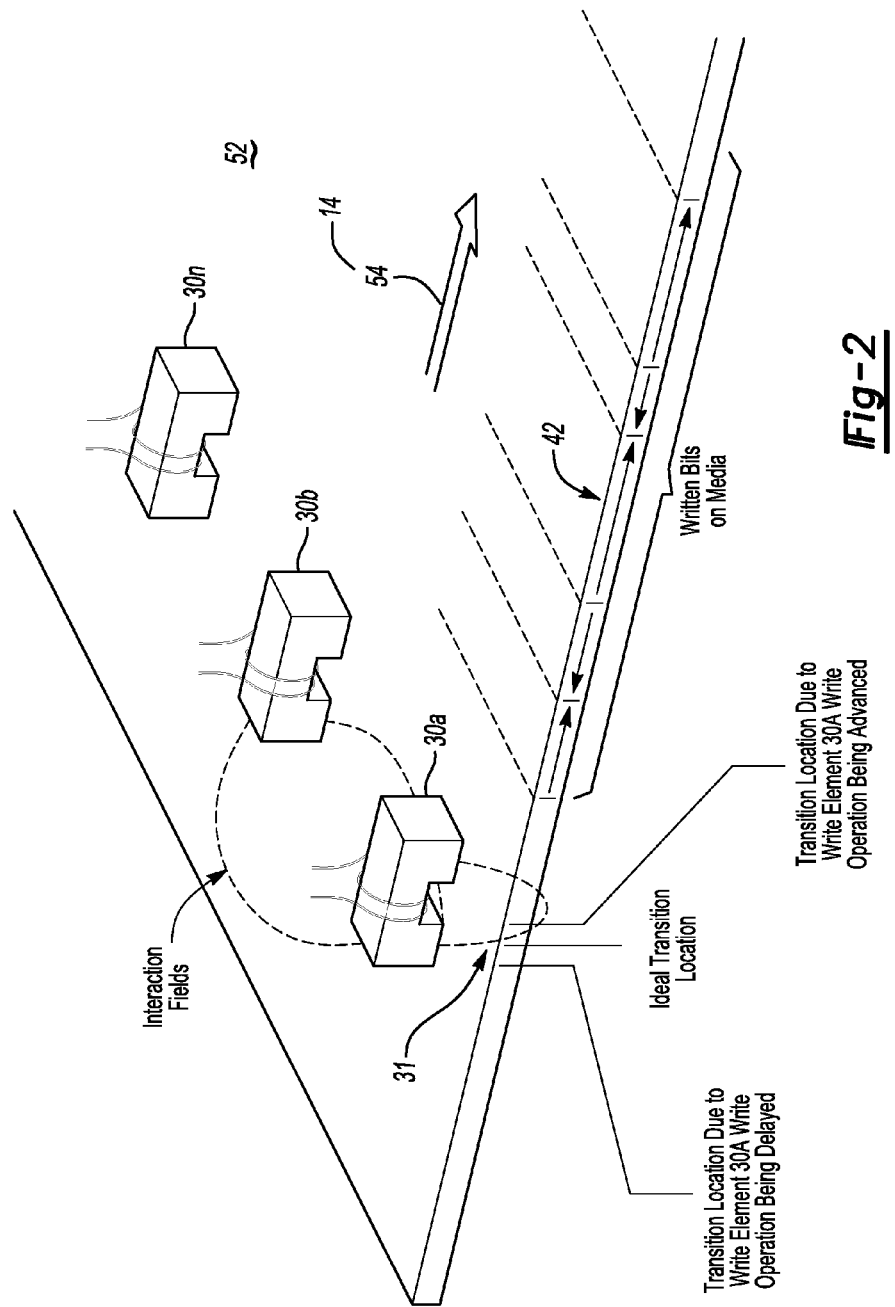
FIG. 2 depicts an array of write elements which illustrate a cross-talk condition.

FIG. 2 depicts an array of write elements 30a-30n, which illustrate a cross-talk condition. Each of the write elements 30a-30n are generally arranged to write data (or data patterns, bits of data, etc.) on corresponding tracks (or channels) 52 of the magnetic tape 14. The tape 14 travels longitudinally (or has a direction of motion) as exhibited by 54. A total of three write elements 30a-30n are shown and form a write portion of the read/write head 15. It is recognized that more than three write elements 30a-30n may be implemented in the read/write head 15.

In general, when a single write element (e.g., the write element 30a) is energized to perform a write operation, the write element 30a generates a magnetic field, which is indicative of the data that is desired to be written (or stored) on the tape 14. Depending on the polarity of the current that is used to energize the write element 30a to perform the write operation, the write element 30a is arranged to write a bit of data that is either pointed left (see generally at 40) or pointed right (see generally at 42) on the tape 14. For example, if current having a forward polarity is applied to the write element 30a, then the write element 30a may write the bit of data to the left 40 on the tape 14. Conversely, if current having a reverse polarity is applied to the write element 30a, then the write element 30a may write the bit of data pointed to the right 42 on the tape 14. As the tape 14 travels in direction 54, bits of data are written and stored on the tape 14.

Each of the write elements 30b-30n also writes bits of data on the tape 14 in response to current. However, each of the write elements 30a, 30b, and 30n may share a similar magnetic field when all of the write elements 30a, 30b, and 30n are energized. For purposes of describing the cross-talk condition in more detail, the write elements 30b and 30n are generally defined as neighboring write elements to the write element 30a. Thus, due to the shared magnetic fields (or cross-talk) between the write elements 30a, 30b, and 30n; the following conditions apply:

(1) if the polarity of the current applied to the neighboring write elements 30b and 30n for writing data is the same as the polarity of the current applied to the write element 30a, then the cross-talk generated between the neighboring write elements 30b and 30n may cause the write element 30a to write data in advance of an ideal position (see generally at 31) on the tape 14 (i.e., the writing operation of the write element 30a is advanced in time (or the write element 30a writes data on the tape 14 earlier than desired or the write element 30a writes data at a first predetermined time that is less than an originally expected write time));

(2) if the polarity of the current applied to the neighboring write elements 30b and 30n for writing data is different than the polarity of the current applied to the write element 30a; then the cross-talk generated between the neighboring write elements 30b and 30n may cause the write element 30a to write data to be delayed with respect to the ideal position 31 on the tape 14 (i.e., the writing operation of the write element 30a is delayed in time (or the write element 30a writes data on the tape 14 later than desired or the write element 30a writes data at a first predetermined time that is greater than an originally expected write time)); and (3) if the polarity of current applied to the neighboring write elements 30b and 30n are different than one another, then the cross-talk generated by the neighboring write elements 30b and 30n are opposite to one another thereby causing no net effect on the write element 30n.

Conditions (1) and (2) above represent various failure modes due to the cross-talk between the neighboring write elements 30b and 30n and the write element 30a. For example, in condition (1), the controller 12 may have expected the write element 30a to write the data at the ideal position 31 and the cross-talk from the neighboring write elements 30b and 30n may have caused the write element 30a to write in advance of the ideal position 31. Likewise, in condition (2), the controller 12 may have expected the write element 30a to write data at the ideal position 31 and the cross-talk generated from the neighboring write elements 30b, 30n may cause the write element 30a to delay writing from the ideal position. Condition (3) above is not considered a failure mode as the opposing cross-talk has no effect on the write element 30a.

As noted above, since the controller 12 has knowledge of what type of data is to be written by each write element 30a, 30b, and 30n before the writing actually occurs and has additional knowledge of the polarity of current that is to be applied to various write elements 30a-30n, the controller 12 can advance in time the manner in which the write element 30a writes a bit of data (e.g., the controller 12 controls the write element 30a to write the data at the predetermined time that is less than the originally expected write time) if the cross-talk between the neighboring write elements 30b and 30n causes a delay in which the write element 30a writes the bit of data. Similarly, the controller 12 can apply a delay for the write element 30a to write data (e.g., the controller 12 controls the write element 30a to write the data at the predetermined time that is greater than the originally expected write time) if the cross-talk between the neighboring write elements 30b and 30n cause the write element 30a to write the bit of data in advance (or at an earlier point of time) of when it is actually desired to be written.

Figure 3:
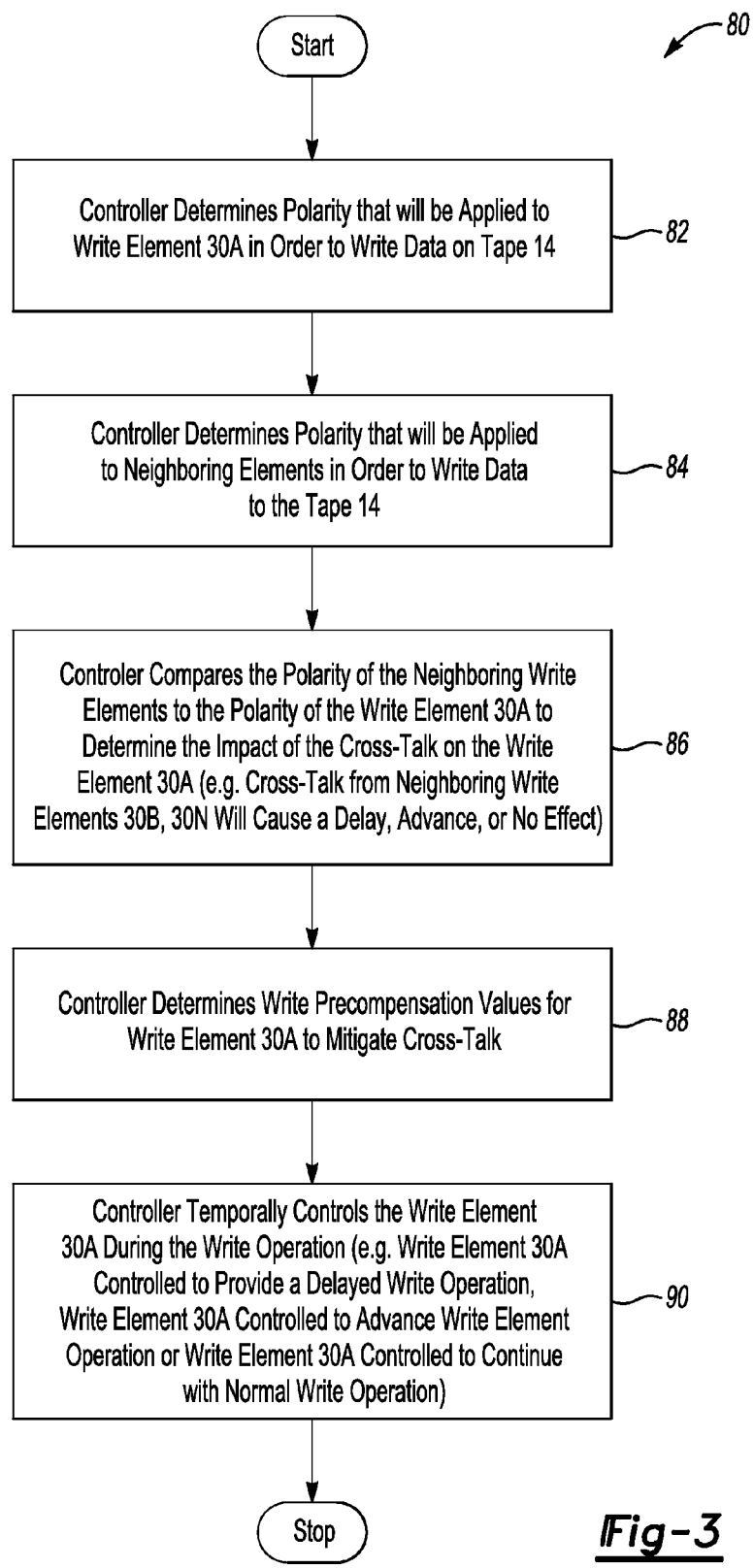
FIG. 3 depicts a method for compensating for writer cross-talk in accordance to one embodiment.

FIG. 3 depicts a method 80 for compensating for writer cross-talk in accordance to one embodiment.

In operation 82, the controller 12 determines the polarity of current (or determines a direction of current flow) that will be applied to the write element 30a for writing data on the tape 14.

In operation 84, the controller 12 determines the polarity of the current (or determines the direction of current flow) that will be applied to each of the neighboring write elements 30b and 30n.

In operation 86, the controller 12 compares the polarity of the neighboring write elements 30b and 30n (or direction of current flow that will be applied to the neighboring write elements 30b and 30n) to the polarity of the write element 30a (or direction of current flow that will be applied to the write element 30a) to determine the effect of the cross-talk that will be generated by the neighboring write elements 30b and 30n with respect to the write element 30a. The comparison and effects are noted in conditions (1)-(3) as described in detail above in connection with FIG. 2.

In operation 88, the controller 12 determines pre-compensation values for the write element 30a in response to determining the effect of the cross-talk generated by the neighboring write elements 30b and 30n with respect to the write element 30a. For example, the pre-compensation value may correspond to applying a delay to the write element 30a during the write operation in the event the cross-talk from the neighboring write elements 30b, 30n cause the write element 30a to advance while writing (see condition 1 above). In addition, the pre-compensation value may correspond to advancing, in time, the moment in which the write element 30a writes the data to the tape 14 in the event the cross-talk from the neighboring write elements 30b and 30n cause the write element 30a to delay writing data (see condition 2 above). Further, the pre-compensation value may correspond to simply writing the data without advances or delays in the event the polarity of current that will be applied to the neighboring write elements 30b and 30n are different from one another (see condition 3 above).

In operation 90, the controller 12 temporally controls the write element 30a to write the data during the write operation. For example, the controller 12 applies the pre-compensation values and controls the write element 30a (e.g., via the write controller 32) to (i) apply a delay when writing data if the cross-talk from the neighboring write elements 30b and 30n would cause the write element 30a to advance in time the writing operation; (ii) advance in time the writing operation if the cross-talk from the neighboring write elements 30b and 30n would cause the write element 30a to delay the writing operation (e.g., write the data at an earlier point in time than an original point of time the data is to be written); and (iii) avoid an advance or delay with respect to the write operation if the polarity of current for the neighboring write elements 30b and 30n are opposite to one another.

Embodiments disclosed herein generally (i) enable the write elements 30a-30n to be tightly spaced while minimizing error that may be caused due to cross-talk by the neighboring write elements 30b, 30n and (ii) compensate for increased cross-talk due to tighter channel pitches. It is recognized that by providing tighter channel pitches, such a condition may also mitigate the problem of tape dimensional stability. Further, embodiments disclosed herein may obviate the need for controlling tape dimensional stability through the use of costly improvements to tape substrate.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A data storage system to compensate for cross-talk while writing data on a magnetic tape, the system comprising:
    a controller for being operably coupled to a magnetic head including a first write element and a plurality of neighboring write elements, the controller being configured to:
        determine a direction of current flow to be applied to the first write element to write first data on a magnetic tape;
        determine a direction of current flow to be applied to each of the plurality of neighboring write elements to write corresponding data on the magnetic tape;
        compare the direction of current flow to be applied to the first write element to the direction of current flow to be applied to each of the plurality of neighboring write elements; and
        control the first write element to write the first data in response to comparing the direction of current flow to be applied to the first write element to the direction of current flow to be applied to each of the plurality of neighboring write elements.

2. The system of claim 1 wherein the controller is further configured to temporally control the first write element to write the first data in response to comparing the direction of current flow to be applied to the first write element to the direction of current flow to be applied to each of the plurality of neighboring write elements.

3. The system of claim 2 wherein the controller is further configured to temporally control the first write element by implementing a delay to write the first data on the magnetic tape.

4. The system of claim 2 wherein the controller is further configured to temporally control the first write element by writing the first data at a predetermined time that is less than an originally expected write time.

5. The system of claim 1 wherein the controller is further configured to:
    control the first write element to write the first data on a first channel on the magnetic tape; and
    control each of the plurality of neighboring write elements to each write the corresponding data on a corresponding channel on the magnetic tape.

6. The system of claim 1 wherein the controller is further configured to control the first write element to delay writing the first data on the magnetic tape if the direction of current flow of the first write element is similar to the direction of current flow for each of the plurality of neighboring elements.

7. The system of claim 1 wherein the controller is further configured to control the first write element to write the first data on the magnetic tape at a predetermined time that is less than an originally expected write time if the direction of current flow of the first write element is different than the direction of current flow for each of the plurality of neighboring elements.

8. The system of claim 1 wherein the magnetic head includes the first write element and the plurality of neighboring write elements thereon and proximate to one another.

9. A method for compensating for cross-talk while writing data on a magnetic tape, the method comprising:
    determining a direction of current flow to be applied to a first write element on a magnetic head to write first data on a magnetic tape;
    determining a direction of current flow to be applied to each of a plurality of neighboring write elements on the magnetic head to write corresponding data on the magnetic tape;
    comparing the direction of current flow to be applied to the first write element to the direction of current flow to be applied to each of the plurality of neighboring write elements; and
    controlling the first write element to write the first data on the magnetic tape in response to comparing the direction of current flow to be applied to the first write element to the direction of current flow to be applied to each of the plurality of neighboring write elements.

10. The method of claim 9 wherein controlling the first write element to write further comprises temporally controlling the first write element to write the first data on the magnetic tape in response to comparing the direction of current flow to be applied to the first write element to the direction of current flow to be applied to each of the plurality of neighboring write elements.

11. The method of claim 10 wherein temporally controlling the first write element to write the first data further comprises delaying the first write element to write the first data in response to comparing the direction of current flow to be applied to the first write element to the direction of current flow to be applied to each of the plurality of neighboring write elements.

12. The method of claim 10 wherein temporally controlling the first write element to write the first data further comprises controlling the first write element to write the first data at a predetermined time that is less than an originally expected write time.

13. The method of claim 9 further comprising:
    controlling the first write element to write the first data on a first channel on the magnetic tape; and
    controlling each of the plurality of neighboring write elements to write the corresponding data on a corresponding channel on the magnetic tape.

14. The method of claim 9 wherein controlling the first write element to write the first data on the magnetic tape further comprises delaying the first write element from writing the first data on the magnetic tape if the direction of current flow of the first write element is similar to the direction of current flow for each of the plurality of neighboring elements.

15. The method of claim 9 wherein controlling the first write element to write the first data on the magnetic tape further comprises controlling the first write element to write the first data at a predetermined time that is less than an originally expected write time if the direction of current flow of the first write element is different to the direction of current flow for each of the plurality of neighboring elements.

16. A computer-program product embodied in a non-transitory computer read-able medium that is programmed to compensate for cross-talk while writing data on a magnetic tape, the computer-program product comprising instructions for:
   determining a direction of current flow to be applied to a first write element on a magnetic head to write first data on a magnetic tape;
   determining a direction of current flow to be applied to each of a plurality of neighboring write elements on the magnetic head to each write corresponding data on the magnetic tape;
   comparing the direction of current flow to be applied to the first write element to the direction of current flow to be applied to each of the plurality of neighboring write elements; and
   controlling the first write element to write the first data on the magnetic tape in response to comparing the direction of current flow to be applied to the first write element to the direction of current flow to be applied to each of the plurality of neighboring write elements.

17. The computer-program product of claim 16 further comprising instructions for temporally controlling the first write element to write the first data on the magnetic tape in response to comparing the direction of current flow to be applied to the first write element to the direction of current flow to be applied to each of the plurality of neighboring write elements.

18. The computer-program product of claim 16 further comprising instructions for delaying the first write element to write the first data in response to comparing the direction of current flow to be applied to the first write element to the direction of current flow to be applied to each of the plurality of neighboring write elements.

19. The computer-program product of claim 16 further comprises instructions for controlling the first write element to write the first data at a predetermined time that is less than an originally expected write time.

20. The computer-program product of claim 16 further comprising instructions for controlling each of the plurality of neighboring write elements to write the corresponding data on a corresponding channel on the magnetic tape.

* * * * *

UNITED STATES PATENT AND TRADEMARK OFFICE
CERTIFICATE OF CORRECTION

| | | |
|---|---|---|
| PATENT NO. | : 8,804,262 B1 | Page 1 of 1 |
| APPLICATION NO. | : 13/924962 | |
| DATED | : August 12, 2014 | |
| INVENTOR(S) | : Partee et al. | |

It is certified that error appears in the above-identified patent and that said Letters Patent is hereby corrected as shown below:

Title Page in the illustrative figure, under Reference Numeral 86, line 1, delete "controler" and insert -- controller --.

In the Drawings

On sheet 3 of 3, in figure 3, under Reference Numeral 86, line 1, delete "controler" and insert -- controller --, therefor.

In the Claims

In column 9, line 7, in Claim 16, delete "read-able" and insert -- readable --, therefor.

Signed and Sealed this
Nineteenth Day of May, 2015

Michelle K. Lee
*Director of the United States Patent and Trademark Office*